United States Patent Office 3,408,862
Patented Nov. 5, 1968

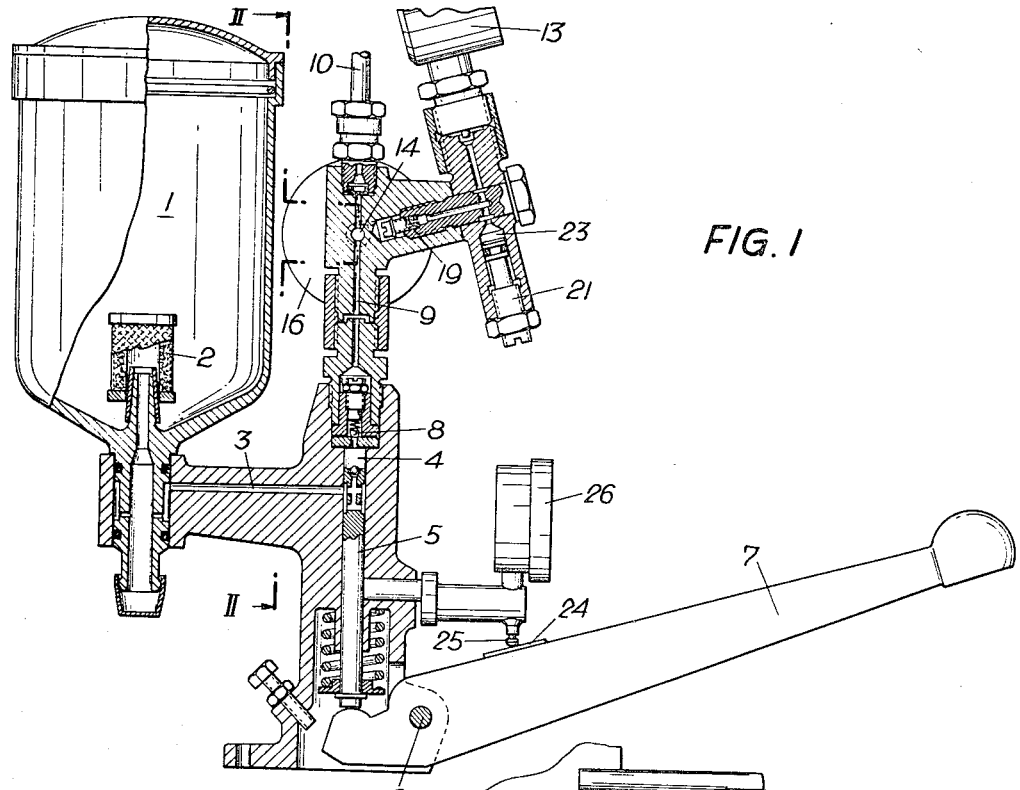
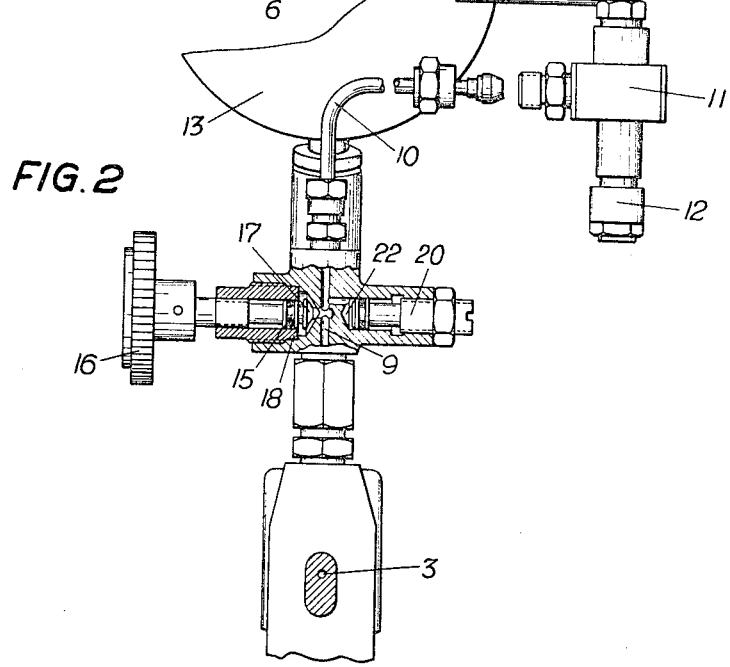

3,408,862
DEVICE FOR TESTING INJECTION NOZZLES
Richard Hainz, Salzburg, Austria, assignor to Friedmann & Maier, Salzburg, Austria
Filed Aug. 23, 1966, Ser. No. 574,361
5 Claims. (Cl. 73—119)

ABSTRACT OF THE DISCLOSURE

Device for high pressure testing of injection nozzles for fuel combustion engines in which a pump delivers a test liquid to the injection nozzle to be tested. The piston of the pump is actuated by a hand lever, and a check valve is disposed leading to the injection nozzle. The check valve limits a high pressure space formed by the conduits leading to the injection nozzle and a pressure space. Means are provided for adjusting the volume of the high pressure space and measuring the volume of the pump output respectively.

---

The present invention relates to a device for high pressure testing of injection nozzles for fuel combustion engines, in which device the test liquid is subjected to pressure by at least one manually actuated piston arranged in a cylinder in a high pressure space delimited against the operating chamber of the piston or the pistons by a check valve, whereby the pressure is indicated by at least one pressure gauge. By devices of the kind described testing of nozzles can be performed with respect to different properties of the nozzle. The injection pressure under which the nozzle opens is determined by measuring, by means of a pressure gauge, that pressure under which the nozzle opens. With such a device it is further possible to control whether the nozzle needle tightly engages the needle seat. For this control a test pressure is prescribed, which is lower than the pressure for opening the nozzle and it is determined whether the nozzle orifice is wetted by the fuel or not. With such a device it is further possible to control the fluid tight engagement of a nozzle needle in its guide, whereby by determining the pressure drop, indicated by a pressure gauge, within a predetermined time interval, leakage losses are estimated. With such a device it is also possible to examine the nozzle needle performance, observing whether the nozzle rapidly opens in an unobjectionable manner at a predetermined pressure with the simultaneous formation of the desired fuel jet. If the nozzle is subjected to a fuel pressure coming close to its opening pressure it is possible that the nozzle is opened and closed several times, what commonly is designated "rattling of the nozzle." It is self-evident, that with such a device also the shape of the jet may be examined.

The pressure drop in the high pressure space of such a device is, with the test liquid fed through the device, to a large extent dependent on the volume of the high pressure space. When feeding equal amounts of test liquid the pressure loss increases with increasing volume of the high pressure space and decreases with decreasing volume of the high pressure space. When testing for tight engagement of the nozzle shaft in its guide by evaluating leakage losses in the nozzle from the pressure loss indicated by the pressure gauge, exactness of the test result is dependent on establishing a definite volume of the high pressure space. It is the same with testing for nozzle performance and "rattling of the nozzle" since during such examination fuel is fed through the device and the nozzle. In prior art devices of the kind described it is not possible however, to keep constant the volume of the high pressure space.

It is now an object of the invention to improve the precision of the results of such testing procedures with which the pressure loss is of major importance. The invention essentially consists in that the volume of the high pressure space is adjustable by at least one adjusting member. Such an adjustment allows for equalizing differences of the size of the high pressure space. As is well known, pressure gauges frequently must be interchanged. The pressure space of the pressure gauge is also part of the volume of the high pressure space and in view of the fact that different pressure gauges are never identical the volume of the high pressure space of the device is changed and with this the test results become incorrect. According to the invention it is now possible to adjust the volume of the high pressure space to a predetermined value. According to the invention conveniently two dip members are provided, at least one of which is connected to the high pressure space at a position upstream the closure valve for the pressure gauge, whereas the second dip member preferably is connected to the high pressure space at a position downstream of the closure valve for the pressure gauge. With this arrangement it is possible to pre-adjust already in the workshop fabrication tolerances by means of the adjusting member arranged upstream of the closure valve and thereby provide for a basic setting. Such adjustment is effected with the pressure conduit leading to the pressure gauge closed and for this reason it is important that this basic adjustment member be located upstream of the closure valve for the pressure gauge. By means of the second adjustment member it is possible to compensate for different volumes of different pressure gauges and it is therefore that this adjustment member can be located downstream of the closure valve for the pressure gauge. For eliminating the influence of the lifting stroke of the pressure gauge valve this lifting stroke, according to the invention, can be limited by a rigid abutment, for example by a flange, such that the valve cone, with the valve closed, always gives free the same space.

The adjusting members are, according to the invention, for instance adjustable dip members, which in dependence on its adjustment protrude into the high pressure space to a greater or lesser extent. Conveniently these dip members are screwed into a wall of the high pressure space, so that adjustment thereof can easily be effected.

According to the invention the stroke of the piston feeding the test liquid into the high pressure space is indicated by a dial gauge. This can be simply effected by actuating the feeler of the dial gauge by means of the hand lever cooperating with the piston. In this manner adjustment of the volume of the high pressure space is easily possible with the adjusting members. It is a basic fact that a definite piston stroke corresponds to a definite pressure increase at the pressure gauge with a given total volume of the high pressure space. The piston stroke, indicated by the dial gauge, necessary for effecting a definite pressure increase at the pressure gauge is empirically established and this pressure stroke is adjusted by changing the setting of the adjusting members.

The invention is further illustrated referring to the drawing, which shows an embodiment of the device for testing fuel injection nozzles.

FIG. 1 represents a device according to the invention partly in elevation and partly in section and FIG. 2 is a view along line II—II of FIG. 1, the view looking in the direction of the arrows.

A test liquid is fed from a container 1 through a filter 2 and a bore 3 within the housing to a pump defined by a cylinder 4 within which a piston 5 is arranged. The piston 5 is actuated by means of a hand lever 7 pivotable around an axis 6, whereby the hand lever 7 cooperates with its shorter lever arm with the lower end of the piston 5. When the piston 5 is actuated, the test liquid is fed through a check valve 8 into a bore or conduit 9 and from such bore through an injection conduit 10 to a nozzle 12 to be tested which is connected to a nozzle holder 11. From the bore 9 a branch-off conduit 14 leads to a pressure gauge 13. The branch-off conduit 14 is provided with a valve 15 which can be actuated by means of a hand wheel 16 to shut off the branch-off conduit 14, if desired. By means of this valve 15 the pressure gauge 13 can be shielded against pressure shocks in the event pressure indications are not necessary for testing purposes. A valve plate or closure member 17 of the valve 15, in the open position, makes contact with an abutment or stop 18 provided within the valve body or housing so that the lifting stroke of the valve is limited such that the valve plate 17, with the valve opened, always provides the same free space.

Within the branch-off conduit 14 leading to the pressure gauge 13, there is further provided a throttle 19 for protecting the pressure gauge against pressure shocks.

The high pressure space of the device according to the invention is composed of the bore 9, the injection conduit 10, the volume of the pressure chamber within the nozzle holder 11, the branch-off conduit 14 leading to the pressure gauge 13 and the volume of the pressure chamber of the pressure gauge 13.

It is of importance for various testing procedures that the volume of the high pressure space has always a constant and definite size since otherwise the testing procedures can not be reproduced and further comparison tests are not possible on testing devices of the same type. For enabling adjustment of the high pressure space two dip members or bolts 20 and 21 are provided, and which can be screwed into chambers 22 and 23 in connection with the high pressure space. The chamber 22 is connected to the bore 9, so that the dip member 20 is provided upstream of the valve 15 for the pressure gauge 13, and the chamber 23 is connected to the branch conduit 14 leading to the pressure gauge 13 and thus is downstream of the valve 15.

The hand lever 7 is provided with a plane face 24, which cooperates with a feeler 25 of a dial gauge 26 fixed to the housing of the testing device.

First, the adjustment of the high pressure space is effected with the valve 15 closed by means of the dip member 20. This adjustment is effected only once by the producer of the testing device and this for the purpose of the accounting of tolerances of the volume of the high pressure space. When effecting this adjustment, in place of a nozzle to be tested, a pressure gauge with an accurately calibrated volume is mounted. Subsequently, the high pressure space is filled by moving the hand lever for smaller strokes around a predetermined setting indicated by the dial gauge 26 until the pressure gauge serving for adjusting purposes shows a predetermined pressure, for example 200 at the gauge. By actuating the hand lever 7 the pressure is increased by a predetermined value and the lever stroke is simultaneously determined on the dial gauge. In case that the lever stroke derived from the reading of the dial gauge 26 is greater than a predetermined value determined at an earlier occasion the volume of the high pressure space is too great. In case that the lever stroke derived from the reading of the dial gauge is smaller than the predetermined value the volume of the high pressure space is too small. The respective differences are eliminated by turning the dip member 20 in the one or the other direction.

By this adjustment of the volume of the high pressure space there is not taken account the volume of the branch-off conduit 14 leading to the pressure gauge 13 and the volume of the pressure gauge per se. Now, the volume of the high pressure chamber is further adjusted by means of the dip member 21, whereby the injection conduit is unscrewed from the testing device and the opened outlet of the testing device is tightly closed by a screw cap with a simultaneous flooding with test liquid fed by a plurality of pump strokes. The above described procedure is repeated. The high pressure space is again filled until the pressure gauge 13 shows a predetermined pressure. Subsequently, the pressure is again increased for a predetermined amount by actuating the hand lever 7, whereby the lever path is derived from the reading of the dial gauge and the difference between the predetermined value and the determined value is eliminated by turning the dip member 21.

In case that the pressure gauge 13 is replaced by another pressure gauge it is only necessary to adjust the volume by means of the dip member 21, because the volume of the high pressure space can only be changed by changing the volume of the pressure gauge.

When using testing devices equipped with two pressure gauges only the pressure gauge with the smaller gauge range is operated, so that only the volume of the pressure gauge when adjusting the volume of the high pressure space is taken into account.

By limiting the lifting stroke of the valve 15 by means of the abutment 18 is guaranteed that the volume of the high pressure space is kept at a constant value at any time after the opening movement of the valve 15.

The invention is not to be confined to any strict conformity to the showings in the drawings but changes or modifications may be made therein so long as such changes or modifications mark no material departure from the spirit and scope of the appended claims.

What we claim is:

1. Device for high pressure testing of injection nozzles for fuel combustion engines, comprising a container for a test liquid, at least one pump with which the container is adapted to communicate, said pump being defined by a piston-cylinder unit, a hand lever for actuating the piston, a first conduit leading from the cylinder, a check valve in the first conduit, a second conduit providing communication between the first conduit and a nozzle to be tested, a pressure gauge, a third conduit providing communication between the first conduit and the pressure gauge, said check valve, conduits and pressure gauge constituting a high pressure space in which the pressure is measured by the pressure gauge, means for adjusting the volume of the high pressure space, and means for measuring the volume of the pump output.

2. The device as claimed in claim 1 in which the means for adjusting the volume of the high pressure space include bolts threadedly inserted into the high pressure space and adjustable in any desired position.

3. The device as claimed in claim 1 including a valve provided in said third conduit, said valve having a body, a movable closure member and a rigid stop therein with the opening movement of the closure member being limited by the rigid stop.

4. The device as claimed in claim 3 in which the means for adjusting the volume of the high pressure space comprise two adjusting members, one of the adjusting members being located upstream of said last named valve and the other member being located downstream in the high pressure space.

5. The device as claimed in claim 1 in which the means for measuring the volume of the pump output include a dial gauge indicating the piston stroke for the test liquid, and a feeler operably related to the dial gauge actuated by the hand lever.

References Cited

UNITED STATES PATENTS

| 2,517,766 | 8/1950 | Cole | 73—119 |
|---|---|---|---|
| 2,744,407 | 5/1956 | Kruger et al. | 73—119 |
| 3,152,473 | 10/1964 | Emerson | 73—119 |
| 3,282,092 | 11/1966 | Lajza | 73—119 |

RICHARD C. QUEISSER, *Primary Examiner.*

JERRY W. MYRACLE, *Assistant Examiner.*